(12) United States Patent
Chen et al.

(10) Patent No.: US 7,039,933 B1
(45) Date of Patent: May 2, 2006

(54) ENHANCED TV BROADCASTING METHOD AND SYSTEM USING TAGS FOR INCORPORATING LOCAL CONTENT INTO A PROGRAM DATA STREAM

(75) Inventors: Shu-Chun Jeane Chen, San Diego, CA (US); James S. Lipscomb, Yorktown Heights, NY (US); Lurng-Kuo Liu, White Plains, NY (US); Jai Menon, Alpharetta, GA (US); Liang-Jie Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 09/725,009

(22) Filed: Nov. 28, 2000

(51) Int. Cl.
*H04N 7/25* (2006.01)
*H04N 7/10* (2006.01)

(52) U.S. Cl. .......................... 725/36; 725/35
(58) Field of Classification Search ............. 725/32–36
See application file for complete search history.

(56) References Cited

U.S. PATENT DOCUMENTS

| | | | | |
|---|---|---|---|---|
| 5,099,319 A * | 3/1992 | Esch et al. | ..................... | 725/36 |
| 5,260,778 A * | 11/1993 | Kauffman et al. | ............. | 725/33 |
| 5,434,978 A | 7/1995 | Dockter et al. | ............. | 395/200 |
| 5,524,001 A * | 6/1996 | Beaudry et al. | ............. | 370/394 |
| 5,585,858 A * | 12/1996 | Harper et al. | ................ | 348/485 |
| 5,636,222 A | 6/1997 | Uriu et al. | ................... | 370/390 |
| 5,636,245 A | 6/1997 | Ernst et al. | ................. | 375/259 |
| 5,781,228 A * | 7/1998 | Sposato | ........................ | 725/32 |
| 5,892,535 A * | 4/1999 | Allen et al. | ..................... | 725/36 |
| 5,917,830 A * | 6/1999 | Chen et al. | .................. | 370/487 |
| 6,029,045 A | 2/2000 | Picco et al. | ................... | 455/5.1 |
| 6,408,163 B1 * | 6/2002 | Fik | ........................... | 455/3.01 |
| 6,446,261 B1 * | 9/2002 | Rosser | ........................ | 725/34 |
| 6,546,556 B1 * | 4/2003 | Kataoka et al. | ................ | 725/35 |
| 6,577,716 B1 * | 6/2003 | Minter et al. | .......... | 379/101.01 |
| 6,588,013 B1 * | 7/2003 | Lumley et al. | ................ | 725/32 |
| 6,615,408 B1 * | 9/2003 | Kaiser et al. | ................ | 725/112 |
| 6,698,020 B1 * | 2/2004 | Zigmond et al. | .............. | 725/34 |
| 2001/0013124 A1 * | 8/2001 | Klosterman et al. | .......... | 725/36 |
| 2001/0037500 A1 * | 11/2001 | Reynolds et al. | .............. | 725/36 |
| 2002/0010928 A1 * | 1/2002 | Sahota | ......................... | 725/40 |
| 2002/0059586 A1 * | 5/2002 | Carney et al. | ................. | 725/35 |
| 2002/0059644 A1 * | 5/2002 | Andrade et al. | ............. | 725/136 |
| 2002/0108128 A1 * | 8/2002 | Lash et al. | .................... | 725/148 |
| 2003/0204854 A1 * | 10/2003 | Blackketter et al. | ........ | 725/113 |

* cited by examiner

*Primary Examiner*—John Miller
*Assistant Examiner*—Scott Beliveau
(74) *Attorney, Agent, or Firm*—Karna Nisewaner

(57) ABSTRACT

A system, method and program product uses tags as markers for incorporating local content in a communications stream, e.g., TV broadcast, cable transmission. A transmitter generates a communication stream including program content for transmission to a receiver. The transmitter includes an authoring tool for generating two types of tags for incorporation into the program content. The receiver captures the program content and stores the tags in tables. One type of tag initiates local action in the program content in the communication stream. A second type of tag is capable of modifying the first type of tag in the tables. When the time for a local action according to a first type of tag is detected, the program content is interrupted by splicing or inserting the local content.

7 Claims, 5 Drawing Sheets

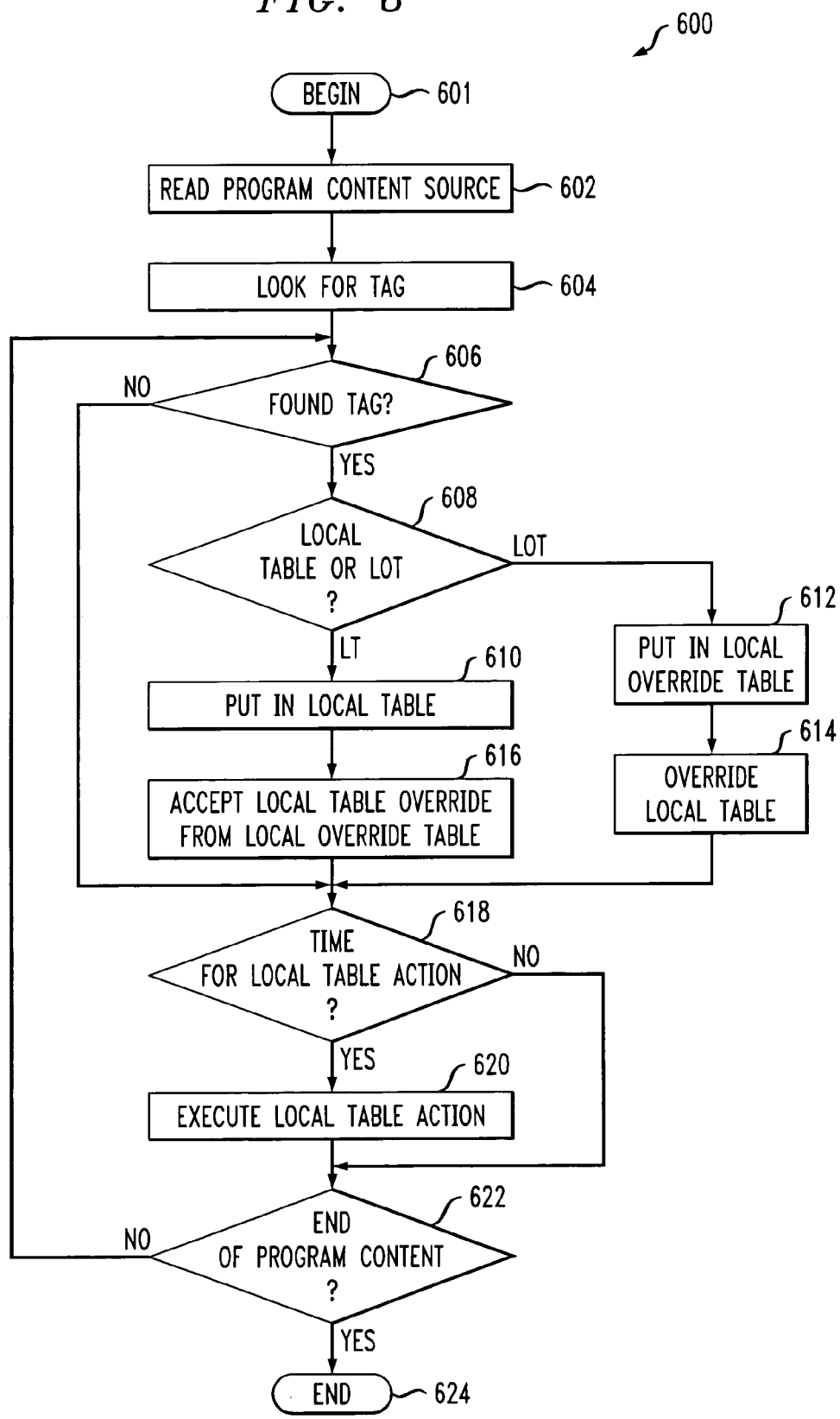

ENHANCED TV BROADCASTING METHOD AND SYSTEM USING TAGS FOR INCORPORATING LOCAL CONTENT INTO A PROGRAM DATA STREAM

BACKGROUND OF THE INVENTION

1. Field of the Invention

This invention relates to communication systems and methods of operation. More particularly, the invention relates to an enhanced TV broadcasting system, method and program product using tags for incorporating local content into a communication stream containing program content.

2. Description of Prior Art

Many TV broadcasting stations, particularly cable systems and digital TV stations transmit programming content over an area in a communication stream using the MPEG-2 format. All station and cable viewers receive the same program content including the same commercials. Typically, there is little opportunity in such current broadcasting systems to include local programming contents or targeted commercials in the communication stream. An emerging technology called Enhanced TV (ETV) aids in inserting local program content and targeted commercials to station and cable viewers. Enhanced TV uses certain technologies from the Internet to deliver graphical and informational elements as components on the same screen as a video program. Once transmitted over the air or via telephone wires or cables, the components are televised on top of video programming as enhancements and viewed on traditional TV sets, computers, and on other video-ready digital products.

To the viewer, "enhancements" appear as graphical and sometimes purely informational elements on the screen and overlay a video broadcast. Often the enhancements are opaquely colored and cover the video broadcast in part or are transparent or semi-transparent. Specific reoccurring elements are icons, banners, labels, menus, information about the program, data one can print, open text fields in which one can insert an email address, or forms to fill out in order to buy a product. If the producer has done an adequate job, the enhancements will be relevant to the television programming beneath it. Alternatively, the TV broadcast can also be shrunk down on the TV screen to make room for the enhancements which may be displayed beside the TV broadcast. Also, the TV broadcast can be blanked out freeing the entire screen for display of the enhancements. An example of screen blanking is the Weather Channel, which every 10 minutes or so replaces the national feed by locally generated displays of the local weather. Regional commercials inserted by cable companies or by local broadcasters over the national feed are another example of screen blanking.

Sometimes the enhancements are interactive. To navigate and participate in such is interactive television broadcasts, viewers can use the buttons on the remote control, type commands or words with a wireless keyboard on certain systems, or use the mouse if experiencing interactive TV via a computer. Depending upon the network, the software on the settop box, or if also connected to the Internet, the viewer will receive access to an electronic programming guide (EPG); a special TV-online service containing links to local information; or applications such as email, games, home banking, community message boards, and many future applications.

In order to further implement enhanced TV there is a need to more effectively organize program content, send the program content into an MPEG-2 data injector which embeds the data into an MPEG-2 transport stream and then insert local content as enhancements into the transport stream.

Prior art related to enhanced TV broadcasting systems, includes:

U.S. Pat. No. 6,029,045 entitled "System and Method for Inserting Local Content into Programming Content" by M. R. Picco et al., issued Feb. 22, 2000, discloses transmitting a programming data stream and a local content digital data stream to a settop box in a house of a user. The settop box stores a predetermined portion of the pieces of local content data based on predetermined criteria and identifies a local content space in the programming data stream. The settop box may also select a particular piece of local content from the storing system to insert into the local content space in the programming data stream based on a plurality of predetermined preferences of the user. The selected piece of local content is retrieved from the storage and inserted into the programming data stream in the local content space so that the individualized local contents specific to the use of the settop box is inserted into the programming data stream.

U.S. Pat. No. 5,636,245 entitled "Location Base Selective Distribution of Generally Broadcast Information" by D. E. Ernest et al. issued Jun. 3, 1997, discloses a system for determining whether information broadcast by a general transmitter is relevant to a particular user based on location, velocity, and/or time of an object of interest. The system includes a remote terminal, a general broadcasting unit, a transmitter at the general broadcasting unit for broadcasting messages including a segment comprising a region, a velocity and/or time corresponding to an event as well as an event specific tag, and storage for storing selection criteria including current position, time and/or velocity information of the user and/or manually entered data of interest. The selection criteria may also include events specific tags. The receiver at the remote terminal receives a message from the transmitter of the general broadcasting unit. A navigational receiver may also be used to acquire navigational information from an appropriate external source. A matching processor at the remote terminal evaluates the segment of the messages, determines if the segment sufficiently matches the stored selection criteria and outputs a match signal. A processor in the remote unit receives the match signal and processes and disseminates the message in accordance with the match signal.

U.S. Pat. No. 5,636,222 entitled "Broadcast Method And System With Cell Tag Information For Multiple Self-Routing" by: S. Uriu et al., issued Jun. 3, 1997, discloses a self-routing switch for executing a broadcast in an ATM mode. The switching unit comprises a central controller, a tag information adder and a self-routing switch. The self-routing switch comprises a plurality of input and output lines. Unit switches are provided for each input line corresponding to each of the output lines. The tag information adder adds routing information for the self-routing switch to a cell transmitted to the self-routing switch. The routing information comprises a set of bits corresponding to each output line. The tag information adds to the cell the routing information in which a bit corresponding to an output line for transmitting the cell is set to predetermined logical value. In executing the broadcast, a plurality of bits corresponding to a plurality of output lines is set to a predetermined logical value. The self-routing switch analyzes the routing information of the cell received by each unit switch and outputs the cell to the output line if the bit corresponding to a unit switch is set to a predetermined logical value. If a plurality of bits of routing information is set to a predetermined value, the cell is outputted from a plurality of output lines thus enabling the broadcast.

U.S. Pat. No. 5,434,978 entitled "Communication Interface Employing Unique Tags Which Enable A Destination To Decode A Received Message Structure" by M. J. Dockter et al., issued Jul. 18, 1998, discloses a communication interface for producing messages in accord with a protocol. Each message comprises at least a first level message structure with a unique tag value that identifies a class of massage structures to which the first level message structure belongs. A unique tag value enables identification of a grammar template procedure that allows analysis of a first level message structure. A destination node receives the first level message structure and includes circuitry for determining the unique tag value. A memory in the destination stores at addresses indicated by unique tag values, grammar template procedures for each class of first level message structures. A processor at the destination node is responsive to a detected unique tag value to access a grammar template procedure at an address in the memory determined from a received unique tag value and to analyze the first level message structure in accordance with the access grammar template procedure. A second level message structure includes a further unique tag value and comprises an assembly group of first level message structures.

None of the prior art discloses an enhanced TV broadcasting system and method of operation transmitting audio/visual program content and enabling local enhancements to be inserted under or as a splice in the program content at each local receiver in a convenient and timely manner.

SUMMARY OF THE INVENTION

An object of the invention is an enhanced TV broadcast system, method and program product for inserting local enhancements into program content.

Another object is an enhanced TV broadcast system, method and program product using tags to insert local enhancements in the program content.

Another object is generating various tags at a local or remote station for incorporation of local content into a program content transmitted by an enhanced TV broadcast system.

Another object is processing various tags for inserting local enhancements in program content transmitted from an enhanced TV broadcast system.

These and other objects, features and advantages are achieved in a system, method and program product using tags as markers for incorporating local content in a communications stream, e.g., TV broadcast or cable transmission. The system includes a transmitter generating a communication stream including program content directed to viewers, listeners, subscribers and the like. The transmitter includes an authoring tool for generating tags incorporated into the program content. A scheduler inserts the tags into the program content so as not to disrupt the audio-visual content in the program by insertion under or splicing in the program content. An insertion module performs the insertion of the tag into the content. The finished program content with tags is stored or sent to an encoder for transmission to a receiver as a communication stream, in one embodiment, using MPEG-2. The tags contain modifications of the content for retransmission to the local receiver area with local content or other actions. The tags are of two types. One tag initiates local action in the program content in the communication stream. A second tag overrides local action. Each tag contains a header, a tag type and tag action. The header indicates the tags that follow in the content. The tag type indicates local program content, i.e., local weather, local commercials, and viewer interaction. Tag action implements the local content. A receiver captures and stores the program content and tags in a buffer. Local tags are stored in a local table. Override tags are stored in a local override table. During the transmission of the program content, a supervisor continuously reads the local table for local tags. When the time for a local tag is detected, the program content is interrupted by splicing or inserting the content according to the tag action described in the local tag. If a local override tag is detected, the local tag is overridden, and the tag action described by the local override tag is performed. As long as there is program content, the supervisor continues to look for tags. The program content may be continuously read or written or may be done by interrupts instead of sequentially.

In another embodiment, program content need not have any tags. Tag actions may be locally generated and placed in the local tag table either by the local systems operator, or remotely from a remote site, and then executable by the supervisor.

DESCRIPTION OF DRAWINGS

The invention will be further understood from the following detailed description of a preferred embodiment taken in conjunction with an appended drawing, in which:

FIG. 8 is a flow diagram of a supervisor included in the tag-processing module of FIG. 7.

DESCRIPTION OF PREFERRED EMBODIMENT

Figure 1:
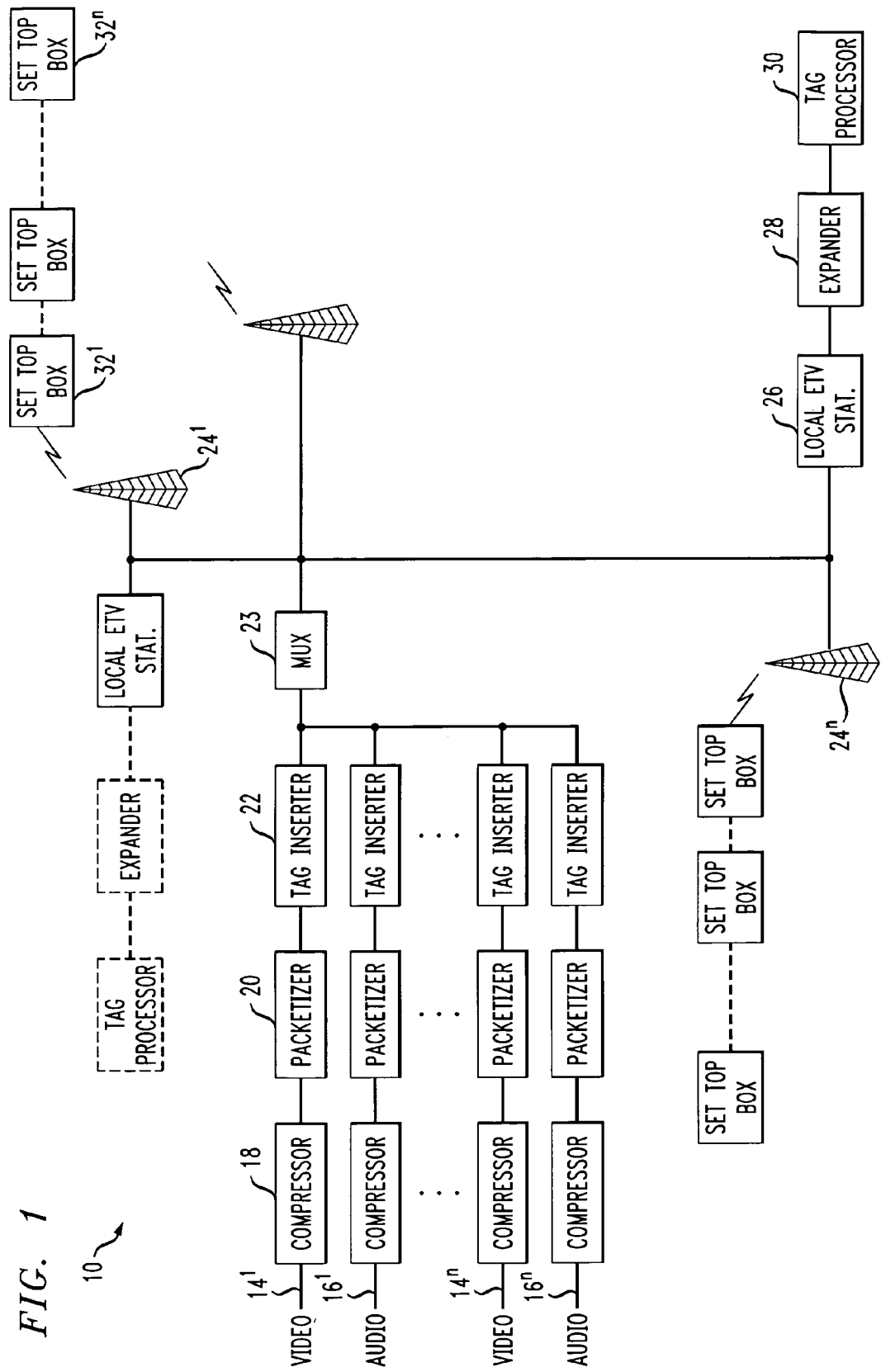
FIG. 1 is a representation of an enhanced TV broadcast system incorporating the principles of the present invention in which a primary station generates a communication stream including program content and tags for incorporation of enhancements by local TV stations.

FIG. 1 discloses an enhanced TV broadcast system 10 including a primary station 12 coupled to a plurality of Video 14$^1$ . . . 14$^n$ (V) and related audio 16$^1$ . . . 16$^n$ (A) communication streams. Each stream is processed in a standard compressor 18 using the MPEG-2 format and packetized in the ATM format using a standard packetizer 20. A tag inserter 22 for enhanced programming may insert tags into the video and audio content at the program source (not shown) The communication streams are combined in a standard multiplexer 23 and transmitted by air or cable or wires to local systems 24$^1$ . . . 24$^n$. The content is overridden by the local systems to insert local content of many forms. The local system maintains tables of information that apply local changes to the program content, as will be described hereinafter. These tables are set either by the local system operator or are set remotely by some central agency. The content with the tags arrives at a local ETV system $24^1$, typically a cable system operator, where the streams are subject to a processor 26, decompressed in an expander 28 and subjected to a tag processor 30 for locally modifying the program content. The local system distributes the locally modified program content to standard settop-box players $32^1 \ldots 32^n$ which may also interact with the modifications to the program content.

Figure 2:
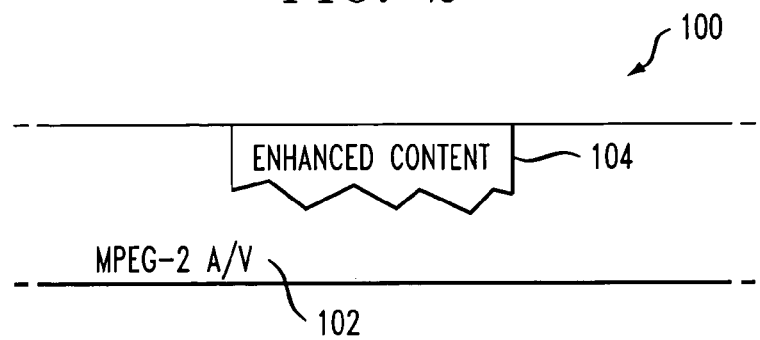
FIG. 2 is a representation of the communication stream of FIG. 1 including program content in MPEG-2 Audio/Visual (A/V) format and an enhancement under the content for distribution to local TV stations.

FIG. 2 shows (V/A) program content represented as a bandwidth of information 100 streaming with time, which has embedded in it some enhanced content (tags, HTML, images, etc.) 104 that streams within it. In this MPEG-2 example, the horizontal axis is time, and the vertical axis is bandwidth. The overall bandwidth 100 is constant. Most of the bandwidth goes to the MPEG-2 Audio and Video (A/V) 102. Some irregular bandwidth is left over and unneeded. Usually that is wasted, but enhanced content 104 can be inserted to some extent as long as it does not squeeze out too much audio-visual information, which would make the video black or jerky or distort the sound.

The Settop box 32 (See FIG. 1) may play this enhanced content for example as a static image (next to a reduced-size video image) to present extra information or to present a buying opportunity and dialog for the viewer. This enhanced content takes bandwidth away from the main MPEG-2 stream, so its insertion must be scheduled to start at a certain time and to stretch out over enough time that it takes a bandwidth small enough to allow the main MPEG-2 stream to maintain the desired quality. There are standard techniques for this called "scheduling", as will be described hereinafter.

Figure 3:
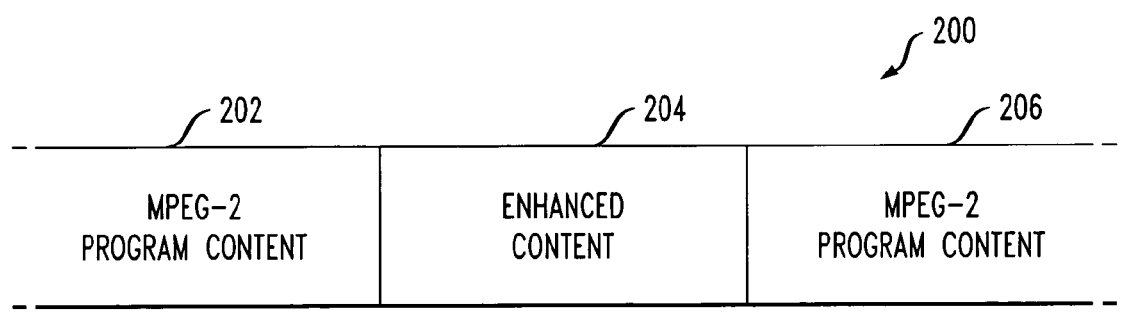
FIG. 3 is a representation of the communication stream of FIG. 1 including program content in MPEG-2 A/V format and an enhancement spliced into the content.

FIG. 3 shows digital program content 202, 206 interrupted for enhanced content 204 to be substituted. A TV commercial is a typical example of enhanced content. There are standard techniques called "splicing" for interrupting the content. In this MPEG-2 example the horizontal axis is time, and bandwidth 200 is the vertical axis. The overall bandwidth 200 is constant. The MPEG-2 program content 202, which includes both audio-visual and other data, is interrupted. A different MPEG-2 stream consisting of enhanced content 204 is spliced into the bandwidth substituting for the original stream. At the end of this enhanced content the original MPEG-2 stream is continued 206 by a second splice.

Both of these forms of enhanced content, scheduled (FIG. 2) or spliced (FIG. 3), can typically be delivered directly by the program content provider, typically a national cable channel. However, local operators may wish to add or substitute local information, purchase opportunities, commercials, etc. not provided by the national feed. Also, the national feed itself may want to proved such information different from what was in the original programming when it was made.

In order to enhance content, tags are inserted into the program content as a marker for the local enhancement. The tags, as will be described hereinafter, may take any form as made by any system. If the tags have a structure not understood by this system they are stored and optionally replaced later whole as single items. If they have been made by the present invention they are stored with this structure and can be partly replaced locally.

Figure 4:
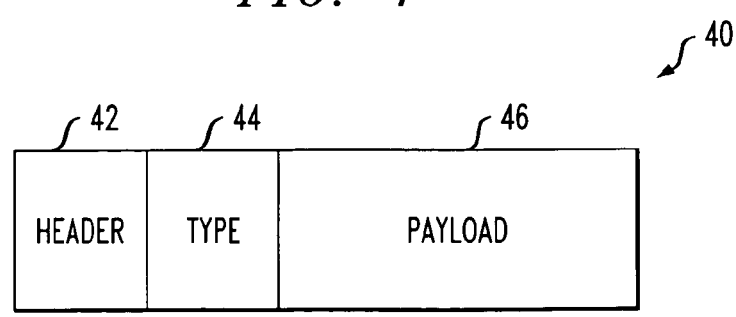
FIG. 4 is a representation of a tag used in the system of FIG. 1.

Turning now to FIG. 4, Tags 40 have a structure, as follows:

Header 42—indicates a tag follows:

Type 44—specifies the type of tag i.e. local or override.

Payload 46—content—additional tag description (optional).

Tags may arrive as character strings or in binary. They may encode their fields positionally or by keyword. The length may be fixed, specified with length fields, or be of arbitrary length followed by a termination string.

Here are some examples of tags for a weather application. First the weather information is cleared:

LocalWeather, Action=DeleteLT, Name=1

Then a specific weather action is loaded into a local system, in this case the Yorktown Heights N.Y. cable headend, for later action:

LocalWeather, TagAction=SetLT, Name=1, SetLT,
    Destination=Yorktown HeightsNY,
    Action=DisplayURL, URL=http://www.Local-
    Weather. com/UpperWestchester County.html,
    Time=Hourly+05:00.000

The type of the tag is LocalWeather, which may or may not be known to the receiving software at the local system. This tag is specified (TagAction) to be set in the Local Table (SetLT) where it will be held for later action. There may be several LocalWeather objects cued up for display at different times, so this one is named "1" to distinguish it from others. When the time comes (5 minutes past the hour), the system action will be to display weather information from the URL specified to settop boxes tuned to the proper channel. The channel is determined either by the system inspecting the tag or explicitly by a Channel=32 specification in the payload.

Figure 5:
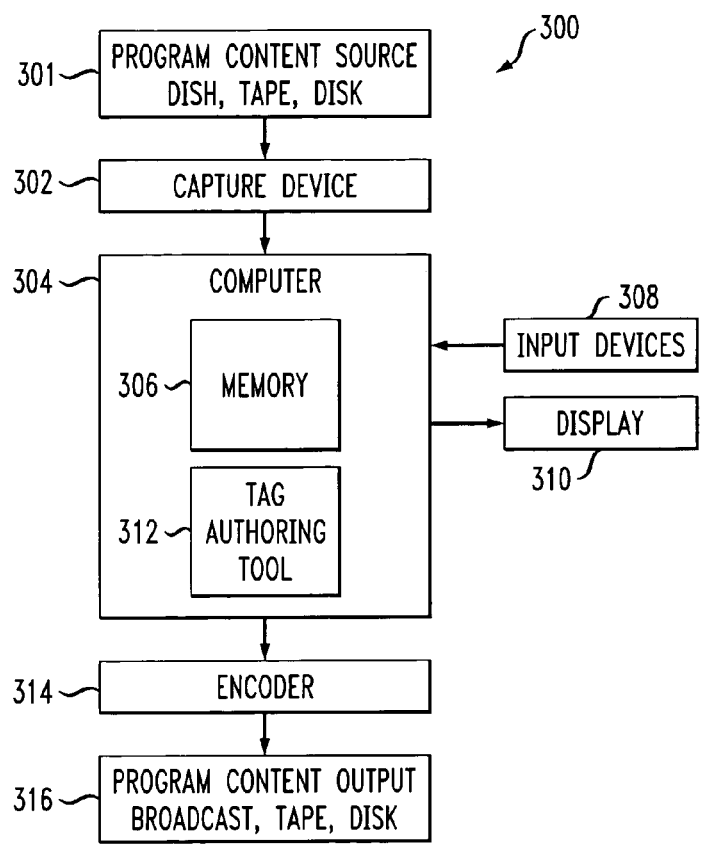
FIG. 5 is a system diagram for inserting tags in program content using a standard authoring tool in the system of FIG. 1.

FIG. 5 shows one embodiment of a system 300 including an authoring tool (not shown) to insert tags into the content either in real time as the content is broadcast or offline to be stored with the program content for later broadcast. The original program content 301 comes in real-time, or from tape or disk storage, etc. The content is optionally captured 302 by a device that decodes the program if need be from its broadcast form to a digital file in a computer 304. The computer contains a memory 306 both as internal and external storage and is optionally controlled by an operator using input devices 308 and a display 310. Inside the computer a tag-authoring tool 312 runs automatically or under the control of the user to compose and insert tags into the program content. The finished program is encoded 314 into broadcast form and an output 316 is either transmitted in real-time or stored for later broadcast.

Figure 6:
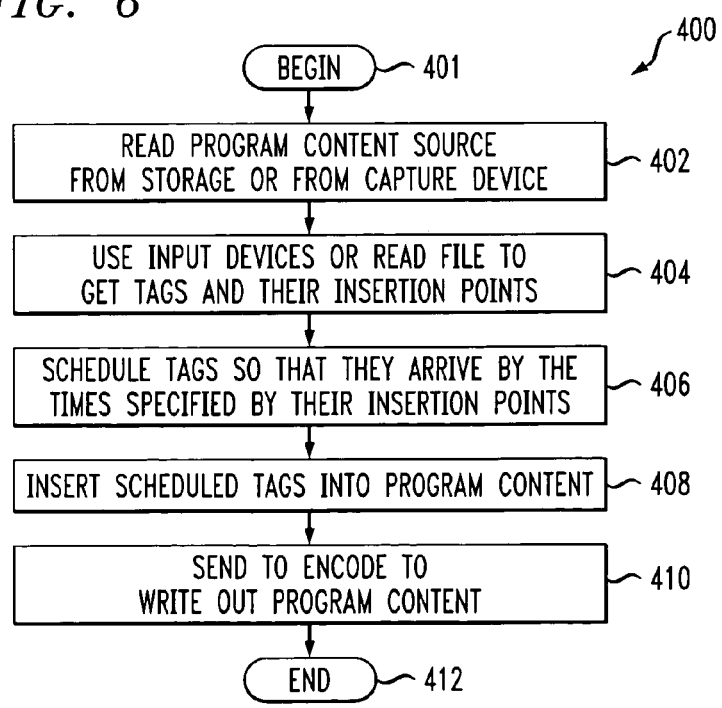
FIG. 6 is a flow diagram for the operation of the system of FIG. 5.

FIG. 6 shows a process 400 for the tag-authoring tool 312 to insert the tags into the original program content source 301. The process begins in block 400. The tag authoring tool in block 402 commands the optional capture device 302 to decode the program if need be from its broadcast form or read it from data storage to a digital file, possibly just a buffer, if the process occurs in real-time. The tag-authoring tool then obtains the tags and where they are to be inserted 404 into the program content from a file or from the computer user's input devices. A scheduler module 406 plans where to insert the tags into the program content using little-enough bandwidth so as not to disrupt the audio-visual content in the program, as in FIG. 2. An insertion module 408 performs the insertion. The finished program content with tags is then stored or sent in block 410 to an encoder for broadcast. This finishes the task 412.

Before looking at the operation of tags in more detail, lets turn to where this tag is going and what happens when it gets there. Recall that in FIGS. 5 and 6 the weather tag example was broadcast to many local systems. We now look at one of those local systems, specifically a system in Yorktown Heights, N.Y. that will act on the tag. Other local systems will ignore the tag.

Figure 7:
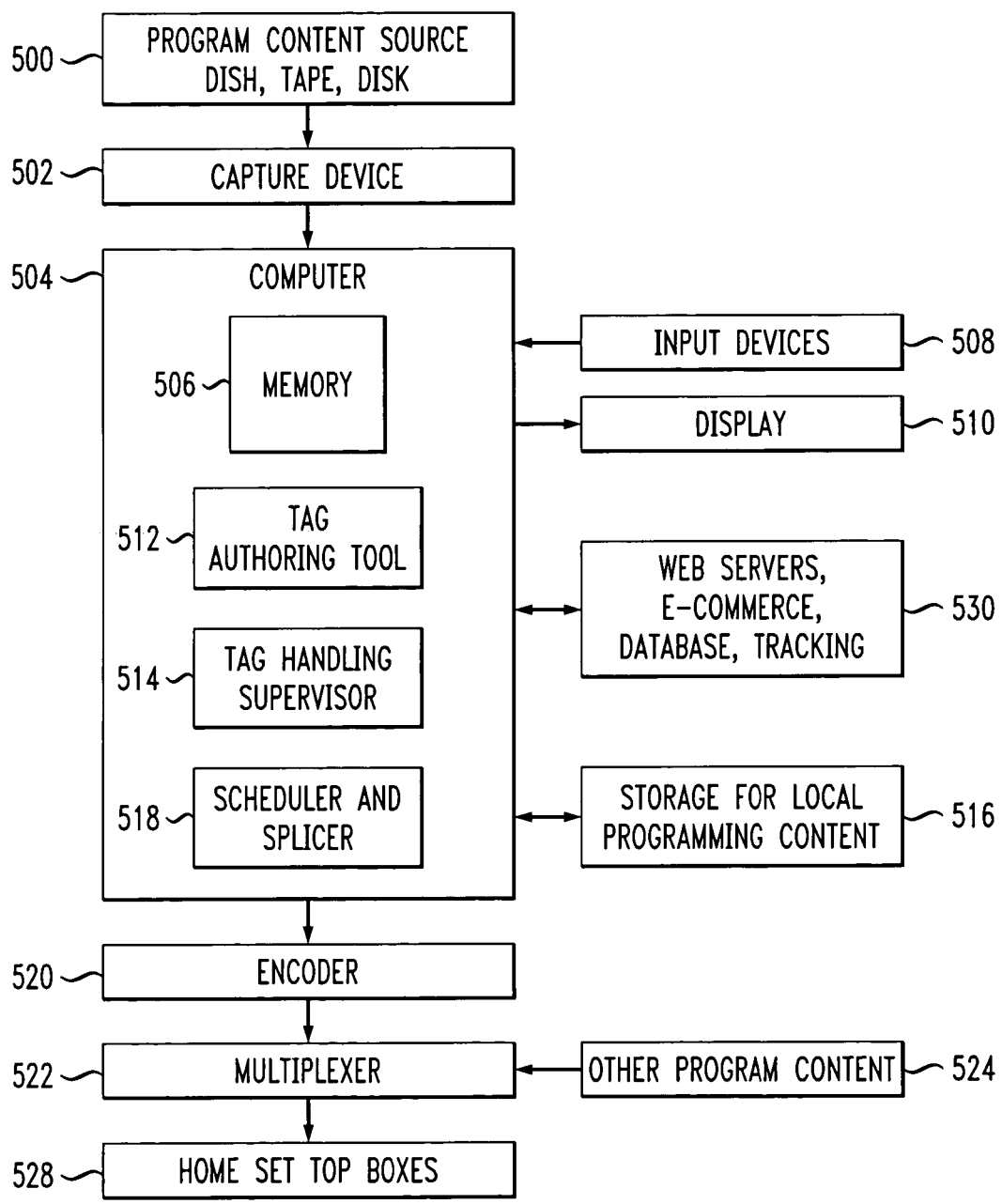
FIG. 7 is a local TV system diagram including a tag-processing module for receiving the program content generated in FIG. 1 and retransmission of the content with locally modified enhancements.

FIG. 7 shows the hardware at a local system receiving the program content with tags and retranslating the program with possibly some locally modified enhancements. The original programs contents 500 come in real-time, or from tape or disk storage, etc. The program content is read from storage or is optionally captured 502 by a device that decodes the program from its broadcast form to a digital file, possibly just a buffer if the process occurs in real-time. Inside the computer 504 are several systems and data structures to deal with the tags. The computer 504 has memory 506 for the program modules and data, and has input devices 508 and a display 510 for tag authoring tool 512 identical to the tag-authoring tool 312 at the broadcast system that originated the program (FIG. 3). The local tag-authoring tool is used if the local system wishes to put tags in program content from scratch. FIG. 7 assumes that the program content arrives at this local system with tags already in it to be modified for local content by a tag-handling supervisor module 514. This supervisor is described in detail below. For now we continue by describing the environment. Using local data tables described below, the supervisor modifies the tags in the program content or calls on local program content 516 and then uses a scheduler module 518 to modify tags or a splitter to substitute local program content. The resulting program is stored or sent to an encoder 520, which makes the program content ready for transmission. The program content is then optionally combined by a Multiplexed 522 with other program content 524 on other channels for broadcast transmission to local setup boxes 528. The setup boxes may not only view program content and enhanced content but may interact with the content, possibly sending back messages to the Multiplexed, which is capable of receiving these messages, often URL requests. The messages are passed to standard software for transmission to various web servers 530, which provide content for tags made by the tag modules or by request from the setup boxes. Also, these web servers may perform e-commerce and database services for the tag modules or for the setup boxes. The servers may also track the setup interactions or local modifications made by the tag modules or perform other functions.

We now explore the detailed operation of the tag-handling supervisor 514. When tags are read from the program content source 500 the tag-handling supervisor 514 puts them in a Local Table below:

Local Table 1
| Header. | Type | Payload |
|---|---|---|
| 1 | LocalWeather, | TagAction=SetLT, Name=1, SetLT, Destination=YorktownHeightsNY, Action=DisplayURL, URL=http://www.LocalWeather.com/UpperWestchesterCounty.html, Time=Hourly+05:00.000 |

Table 1 shows the Local Table with one entry, the weather tag read from the program content source 500. The tag type is Local Weather, and the payload is simply the remainder of the tag.

The supervisory program 514 observes that the tag has arrived, plans to get the specified URL ahead of time so it is ready to start injecting content in the output stream in accordance to what the scheduler 516 specifies so that the content arrives at the settop boxes in time for display at 5 minutes past the hour. More on this supervisory program shortly.

In the preceding example the given local system obtained its tag directly from the broadcast. That is one way this system can work. However, in another embodiment each local system obtains local information ahead of time, so that when the program content source broadcasts a tag type identified as generic, each local system receiving the broadcast, may act individually upon the tag. To act individually, each local system includes a Local Override Table having the same format as the local table. We give another weather display example, starting over from the beginning.

At some time before the broadcast the local system receives the generic tag that will eventually be broadcast along with the local action that is to replace it. This information could be broadcast as tags from a central source to all local systems, or it could come from files or keyboard entry 508 at the local system. This information along with action is put in the Local Override table.

Local Override Table 2
| Header | Type | Payload |
|---|---|---|
| 2 | LocalWeather, | TagAction=SetLOT, Action=Replace A by B, Name=1, A=default, B=UpperWestchesterCounty |

Table 2 shows the Local Override table with one entry. The tag arrives with the LocalWeather type and a long payload. The action the tag must take is to place itself in the Local Override table (SetLOT). Once there its action is to replace string A by string B (ReplaceAbyB) when they arrive. String A is "default" and string B is "UpperWestchesterCounty".

Later, when the program is broadcast it will be simplest for the broadcaster to send the same token to all local systems.

Local Table 3
| Header | Type | Payload |
|---|---|---|
| 3 | LocalWeather, | TagAction=SetLT, Name=1, SetLT, Destination=YorktownHeightsNY, Action=DisplayURL, URL=http://www.LocalWeather.com/default.html, Time=Hourly+05:00.000 |

Table 3 shows the generic broadcast token after it arrives into the Local Table during the program content broadcast.

The token awakens the supervisory program, which scans the Local Override Table (Table 2) for any matching entry "LocalWeather" Name=1. The supervisory program finds an entry and executes the instruction there to replace the "default" string by "UpperWestchesterCounty".

Local Table 4
| Header | Type | Payload |
|---|---|---|
| 4 | LocalWeather, | TagAction=SetLT, Name=1, SetLT, Name =1 SetLT, Destination=Yorktown HeightsNY Action Display URL URL=http://www.LocalWeather.com/UpperWestchesterCounty.html, Time=Hourly+05:00.000 |

Table 4 shows how the supervisory program modifies the Local Table with local information. All local systems are now ready to substitute their local information.

FIG. 8 shows more fully the operation of the supervisor 514, which was just illustrated by example in the weather example above. A process 600 begins at block 601. The supervisor reads the program content source in block 602. As it reads the program it looks for tags in block 604. When it finds one in block 606 it examines the tag in block 608 to see if it should be stored in the Local Table in block 610 or should be placed in the Local Override Table in block 612. If the tag goes to the Local Override Table, then it is examined to see if it should immediately override the Local Table in block 614, and the supervisor then looks for the next tag 604. If the tag goes to the Local Table in block 610, then it may be overridden by the Local Override Table in block 616. In block 618, if it is time to do what a tag in the Lookup Table is for, then the supervisor executes the in block 620, possibly splicing or inserting content or tags in the program content stream. As long as there is more program content to process, then the supervisor looks for more tags in block 624, else the process 600 ends in block 624.

The program content may be continuously read and written while this is going on, and the processes in FIG. 8 may be done by interrupts instead of sequentially.

Following the display of the first hourly weather, the display will continue at 5 minutes past every hour until the action is reset upon receiving the following token:

| Header | Type | Payload |
|---|---|---|
| | LocalWeather | TagAction=SetLT, Name=1, Action=None |

Or upon deleting the tag from the Local Table by receiving:

LocalWeather TagAction=DeleteFromLT, Name=1

Other tag information can consist of, for example, but not limited to, giving an advisory of when to load the HTML page from the server to the local system, so that it will likely be ready when the time comes to insert into the output program:

| LocalWeather | TagAction=SetLT, Name=1, GetURLBy=Hourly+02:00.000 |
|---|---|

An example of a tag that requests immediate action is:

LocalWeather TagAction=SetLT, Name=1, Time=Now

However, a tag with no time specified might also be acted on immediately, because the supervisor program has the last word on filling in missing tag characteristics as seen fit or even overriding the tag settings regardless of the settings in either the Local Table or the Local Override Table.

An example of a local commercial would be the broadcast of the following tag:

| LocalCommercial | Name=ABCMorningNews2, TagAction=SetLT, Time=2000:3:3:07:50.000, Action=Splice |
|---|---| with the Local Override Table set to:

| | LocalCommercial, Name=ABCMorningNews2,TagAction=SetLOT, Action=AddA, A="Media=C:\AlsToyStore.mpg" |
|---|---| resulting in the Local Table being set to:

| LocalCommercial | Name=ABCMorningNews2, TagAction=SetLT, Time=2000:3:3:07:50.000, Action=Splice, Media=C:\AlsToyStore.mpg |
|---|---| which adds the field for the local media to be played during the commercial by a video splice into the input program content.

An example of tracking would be the broadcast this tag:

| LocalWeather | TagAction=SetLT, Name=1, SetLT, Action=Track, URL=Http://www.trackingserver.com/cgi-bin/track-cgi?clickedWeather |
|---|---| with the Local Override Table set to:

| LocalWeather | Name=1, TagAction=SetLOT, Action=Replace A by B, A=clickedWeather, B=clickedUpperWestchesterCountyWeather |
|---|---| resulting in the Local Table being set to:

| LocalWeather | TagAction=SetLT, Name=1, SetLT, Action=Track, URL=Http://www.trackingserver.com/cgi-bin/track-cgi?clickedUpperWestchesterCountyWeather |
|---|---| which tracks user interaction with the local weather. At the appropriate time (5 minutes past every hour as set in the additional Local Table entry some distance above), this URL will be sent to the settop box, which upon user click will send the tracking URL request back to the cable head-end, which will send it to the tracking server.

There is no necessity for the local system to be limited to overriding tags that come from a remote program source. The program source could be local. The program source need not have any tags, so that tags indicating actions may simply be placed in the Local Table either by the local system operator or remotely in earlier program source from a remote site, and then be ready to act without help from the program source.

While the invention has been described with reference to specific embodiments, the description of the specific embodiments is illustrative only and is not to be considered as limiting the scope of the invention. Various other modifications and changes may occur to those skilled in the art without departing from the spirit and scope of the invention.

We claim:

1. A system for incorporating local content into a communication stream, comprising:
   a) means for transmitting a communication stream including program content to a receiver;
   b) means for inserting in the program content one or more first tags and one or more second tags;
   c) means for capturing the program content at the receiver and storing the one or more first tags and the one or more second tags in tables;
   d) means for processing the one or more second tags in the tables to modify at least a portion of at least one of the one or more first tags in the tables; and
   e) means for processing the one or more first tags in the tables to insert local contest in place of the program content for re-transmission to the local area served by the receiver, wherein the processing means comprises:
   a supervisor for scanning the tables; and
   means for detecting a scheduled time in the program content for initiating and transmitting local action described in the one or more first tags.

2. The system of claim 1 further comprising:
   f) means for authoring the one or more first tags and the one or more second tags and inserting them into the program content.

3. The system of claim 1 further comprising:
   g) means for scheduling the one or more first tags in the program content for local action.

4. The system of claim 1 wherein the tables comprise:
   a first table means in the receiver for storing the one or more first tags; and
   a second table means for storing the one or more second tags.

5. The system of claim 1 wherein the one or more first tags comprises means for identifying local content for splicing or replacing program content.

6. The system of claim 1 wherein the one or more first tags and the one or more second tags comprise a header, tag type and local action.

7. The system of claim 1 wherein the means for inserting tags in the program content comprises an authoring tool generating the one or more first tags and the one or more second tags.

* * * * *

UNITED STATES PATENT AND TRADEMARK OFFICE
CERTIFICATE OF CORRECTION

PATENT NO. : 7,039,933 B1
APPLICATION NO. : 09/725009
DATED : May 2, 2006
INVENTOR(S) : S-J. Chen et al.

Page 1 of 1

It is certified that error appears in the above-identified patent and that said Letters Patent is hereby corrected as shown below:

On the cover page, column 1, No. (56), please insert the following reference:

--Interactive TV Today, The American Film Institute-Intel Enhanced Television Workshop. July, 1999. "Enhanced Television: A Historical an Critical Perspective", pp. 1-15.--

In the Specification:

Col. 3, line 28, delete "and".

Col. 6, line 45, delete "400".

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,039,933 B1 | Page 1 of 1 |
| APPLICATION NO. | : 09/725009 | |
| DATED | : May 2, 2006 | |
| INVENTOR(S) | : S-J. Chen et al. | |

It is certified that error appears in the above-identified patent and that said Letters Patent is hereby corrected as shown below:

On the Title page, column 1, No. Item (56), please insert the following reference:

--Interactive TV Today, The American Film Institute-Intel Enhanced Television Workshop. July, 1999. "Enhanced Television: A Historical and Critical Perspective", pp. 1-15.--

In the Specification:

Col. 3, line 28 delete "and".

Col. 6, line 45, delete "400".

Signed and Sealed this

Twelfth Day of December, 2006

JON W. DUDAS
*Director of the United States Patent and Trademark Office*